United States Patent [19]

Franz

[11] Patent Number: 5,641,576

[45] Date of Patent: Jun. 24, 1997

[54] BUFFERED ACID INTERLEAVING FOR GLASS SHEETS

[75] Inventor: Helmut Franz, Pittsburgh, Pa.

[73] Assignee: PPG Industries, Inc., Pittsburgh, Pa.

[21] Appl. No.: 528,833

[22] Filed: Sep. 15, 1995

[51] Int. Cl.$^6$ ........................................ B32B 17/06
[52] U.S. Cl. .................. 428/426; 206/451; 211/41.14; 211/49.1; 427/154; 427/164; 427/165
[58] Field of Search .............................. 206/451; 211/41, 211/49.1; 428/426; 427/154, 164, 165

[56] References Cited

U.S. PATENT DOCUMENTS

| | | | |
|---|---|---|---|
| 4,487,807 | 12/1984 | Duffer et al. | 428/422 |
| 4,489,106 | 12/1984 | Duffer et al. | 427/154 |
| 4,529,648 | 7/1985 | Duffer et al. | 428/326 |
| 4,530,889 | 7/1985 | Duffer et al. | 428/326 |
| 4,568,605 | 2/1986 | Duffer et al. | 428/326 |
| 4,606,946 | 8/1986 | Duffer et al. | 427/384 |
| 5,379,904 | 1/1995 | Brown | 211/41 |

*Primary Examiner*—D. S. Nakarani
*Attorney, Agent, or Firm*—Raymond J. Harmuth

[57] ABSTRACT

An organic acid anti-staining composition for glass sheets is disclosed herein whereby the corrosive effects of very low pH are eliminated by buffering the organic acid. The buffered organic acid has a less acidic pH, but is as effective as unbuffered organic acid in neutralizing alkali formed by sodium from the glass to prevent staining of the glass surface.

14 Claims, 1 Drawing Sheet

BUFFERED ACID INTERLEAVING FOR GLASS SHEETS

FIELD OF THE INVENTION

This invention relates generally to the art of interleaving materials used to separate glass sheets when they are stacked for transportation or storage, and more particularly to interleaving materials containing acid, such as adipic and/or malic acid.

BACKGROUND

It is well known that water can react with soda-lime-silica glass, very slowly, leaching sodium ions from the glass and forming sodium hydroxide, which raises the pH of the water in contact with the glass surface as follows:

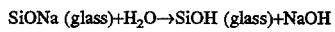

If a small volume of water is left in contact with a glass surface for a prolonged period, as can occur in a stack of glass sheets in transit or storage, the pH can become highly alkaline. At pH levels above about 9.0, the hydroxide ions can cause corrosion of the glass surface by destroying silicon-oxygen bonds as follows:

literally dissolving the glass which results in a hazy or iridescent corroded glass surface. Since transportation and storage conditions cannot always be controlled, it has been common practice for glass manufacturers to use a variety of paper or powder interleaving materials between the surfaces of stacked glass sheets to retard stain damage. Such interleaving materials provide physical separation of the glass sheet surfaces, to minimize mechanical damage, such as abrasion, and also may comprise acid compounds to neutralize the hydroxide formed from alkali ions reacting with water, and retard the pH increase which leads to staining of the glass surface. A common interleaving material comprises polymethylmethacrylate beads for physical separation and adipic acid for neutralizing the hydroxide. Glass sheets may be stacked for transportation and/or storage in a variety of pack, box, pallet or rack configurations. A preferred shipping rack is described in U.S. Pat. No. 5,379,904, the disclosure of which is incorporated herein by reference.

U.S. Pat. No. 4,487,807 to Duffer et al. discloses protecting glass surfaces in a stack of glass sheets by treating the surfaces with a mixture of stain-inhibiting organic acids which crystallize on the glass surface, and separating adjacent glass sheets with an interleaving material, preferably in particulate form, such as synthetic polymeric beads or natural porous cellulose materials such as wood flour.

U.S. Pat. No. 4,489,106 to Duffer et al. discloses a two-step method for protecting glass surfaces in a stack of glass sheets by first treating the glass surfaces with a solution of stain-inhibiting organic hydroxy acid and drying the surface prior to dispersing a finely divided particulate interleaving material on the glass surface.

U.S. Pat. No. 4,529,648 to Duffer et al. discloses a method for applying a powdered interleaving material to a glass surface in the form of an aqueous slurry. The powdered interleaving material is preferably a porous cellulose material, such as wood flour or rice flour, which may also comprise a stain-inhibiting acid material such as boric acid, citric acid or tartaric acid.

U.S. Pat. Nos. 4,530,889 and 4,568,605 to Duffer et al. disclose methods and compositions to reduce the staining of stacked glass sheets utilizing porous particulate interleaving materials treated with strong organic acids, such as organotin halides and hydroxy carboxylic acids, respectively.

The above stain prevention techniques share significant disadvantages. The low solubility of some organic acids requires application of additional acid in powder form, and in cold weather it may be necessary to heat the solution to prevent precipitation of acid, clogging lines and nozzles. The very low pH of the acid solutions used to prevent stain by neutralizing alkali as it forms from sodium diffusion from the glass substrate causes corrosion of metal equipment used to apply the acid solution and process the glass.

SUMMARY OF THE INVENTION

The present invention provides stain-inhibiting protection to glass surfaces of stacked glass sheets utilizing stain-inhibiting acids which are in buffered form. Stain-inhibiting performance of the acid is not compromised, while acidic corrosion of equipment and environment is substantially reduced. The buffered acid stain-inhibiting material is readily soluble in water and so may be applied in aqueous solution form.

DESCRIPTION OF PREFERRED EMBODIMENTS

Figure 1:
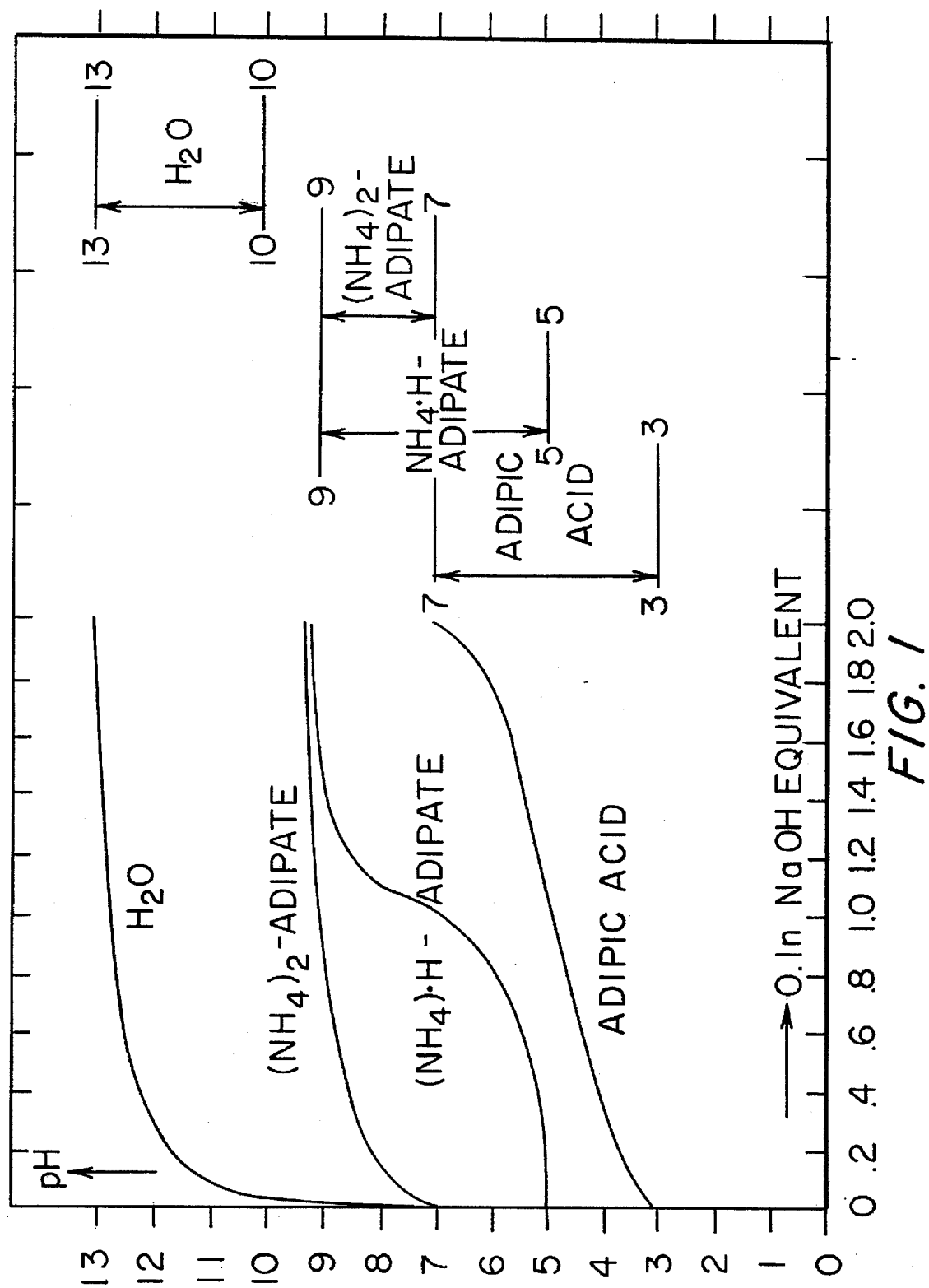
FIG. 1 illustrates the pH as a function of the amount of sodium hydroxide neutralized by solutions of adipic acid, monoammonium adipate and diammonium adipate respectively.

Various organic acids of the general formula RCOOH, wherein R is an organic radical, and there may be more than one carboxylic acid group, such as citric, succinic, tartaric, malic, maleic and ethylenediaminetetraacetic (EDTA) acid, may be used to prevent stain in accordance with the present invention. A preferred stain-inhibiting acid in accordance with the present invention is adipic acid. Adipic acid is a dicarboxylic acid capable of neutralizing two equivalents of sodium hydroxide over the pH range of about 3 to 7. Adipic acid is soluble in water at low levels, for example about 1.4 percent by weight at 60° F., 1.2 percent at 50° F. and 1.0 percent at 40° F. to yield an aqueous acid solution with a pH of about 2.75.

In accordance with the present invention, adipic acid may be used in buffered form by reacting the adipic acid with ammonium hydroxide to yield ammonium adipate. By reacting adipic acid with up to an equimolar amount of ammonium hydroxide, primarily monoammonium adipate is formed according to the following reaction.

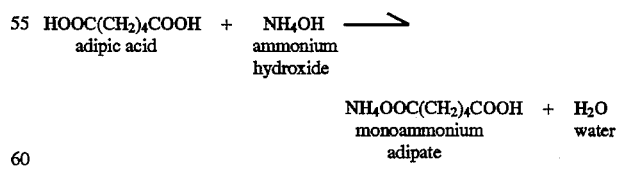

Monoammonium adipate is readily soluble in water at concentrations of up to 10 percent by weight at ambient temperatures. The higher solubility of the buffered acid prevents precipitation at cold temperatures and allows sufficient stain-preventing material to be applied to the glass surface so that additional neutralizing capacity in the form of powder need not be applied in a later step. The pH of an aqueous solution of monoammonium adipate is about 5, and so is far less corrosive than solutions of adipic acid. Solutions of monoammonium adipate show no significant loss of alkali-neutralizing capacity compared with adipic acid solutions at the same concentrations as shown in FIG. 1. Monoammonium adipate will also neutralize two equivalents of sodium hydroxide, but over a pH range of about 5 to 9. Reacting adipic acid with more than an equimolar amount of ammonium hydroxide, up to a 1:2 ratio, produces a mixture of monoammonium and diammonium adipate according to the further reaction as follows.

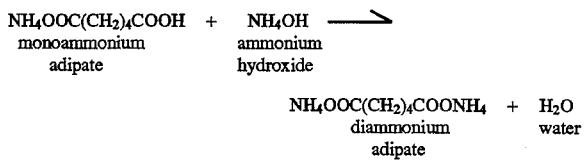

Such a mixture is even more soluble in water, readily dissolving up to at least about 20 to 25 percent by weight at ambient temperatures, to produce a solution with a pH approaching neutral, and similar alkali-neutralizing performance as solutions of monoammonium adipate and adipic acid as shown in FIG. 1. Diammonium adipate is capable of neutralizing two equivalents of sodium hydroxide as well as monoammonium adipate or adipic acid, but over a pH range of about 7 to 9. Mixtures of adipic acid, monoammonium adipate and diammonium adipate in any proportion may be used in accordance with the invention. The proportions may be adjusted to give any desired initial pH, preferably above 3.

Preferred solutions of buffered acid comprise 1 to 10, preferably about 4, percent by weight of ammonium adipate in water to yield a pH above 3, preferably near 5, up to a neutral pH of 7. The concentration of buffered acid in solution is preferably about 2 to 5 percent by weight. The buffered acid solution is preferably applied at a rate such that the amount of buffered acid on the glass surface is sufficient to neutralize the quantity of alkali expected to be formed. For ammonium adipate applied to typical soda-lime-silica float glass compositions, a coverage rate of 5 to 40, preferably 10 to 20, most preferably about 15, milligrams per square foot of glass is preferred. The buffered organic acid neutralizes alkali formed from sodium from the glass according to the following reactions.

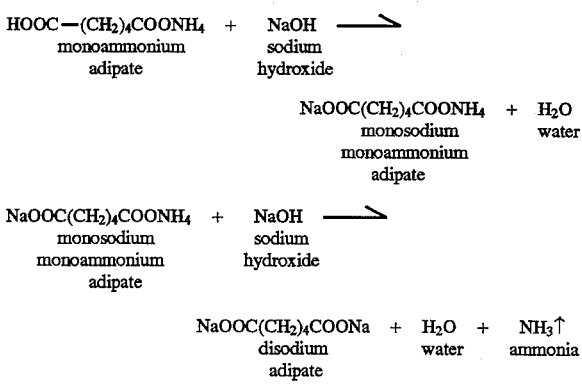

Thus the full neutralizing capacity of an organic acid stain-inhibiting material can be utilized to prevent alkali-induced stain without the corrosive effects of the very low pH of an acidic solution, and without exceeding a pH of 9.25, the equilibrium pH for the $NH_3/NH_4^+$ buffer system, which is the threshold pH for glass staining by excess alkali. Organic acids can be buffered with other buffering agents, such as amines. However, if amines or other buffering agents are used, some neutralization reaction by-product will be formed which must be removed from the glass surface. For this reason, it is preferred to buffer the organic acid by reaction with ammonium hydroxide. Thus, in the neutralization reaction with alkali, ammonia and water are formed, which form no residue on the glass surface. Furthermore, the ammonia formed in the neutralization of surface alkali will dissipate without raising the pH of the water in contact with the glass surface. In an alternative to reacting adipic acid with ammonium hydroxide to form ammonium adipate, comparable antistaining results are achieved by mixing adipic acid and diammonium adipate. In approximately equimolar ratio, such a mixture is comparable to a solution of monoammonium adipate at the same molar concentration.

In order to apply the buffered acid solution to a glass surface by conventional liquid application techniques, such as a linear curtain spray as described in U.S. Pat. No. 4,072,772, the disclosure of which is incorporated herein by reference, a suitable surfactant is added, as disclosed in copending application U.S. Ser. No. 08/528,830, now pending, filed on even date herewith, entitled "Method and Composition for Applying Acidic Interleaving Material in Aqueous Media to Glass Sheets". The surfactant is preferably a nonionic, anionic or amphoteric surfactant with low foaming properties, a high cloud point and efficient rinsing. Preferred surfactants include alkylaryl polyethoxy benzyl ethers and alkyl polyethoxy methyl ethers. The concentration of surfactant is preferably in the range of 0.01 to 0.10 percent by weight of the buffered acid solution.

The higher solubility of buffered acid, e.g. ammonium adipate, allows application of sufficient neutralizing capacity in a single step, i.e. without additional acid in powder or particle form, and prevents precipitation of acid at lower temperatures, which reduces clogging of equipment and the need to heat the solution in cold weather.

The higher pH of buffered acid solution, e.g. pH of about 5 for monoammonium adipate, causes less corrosion of equipment than an organic acid solution, e.g. adipic acid at a pH of about 2.75. The neutralizing pH range of about 5 to 9 for buffered acid material is more neutral than the neutralizing pH range of about 3 to 7 typical of acids such as adipic acid, while still neutralizing the same quantity of alkali, equivalent per equivalent, e.g. two moles of sodium hydroxide per mole of either adipic acid, monoammonium adipate, diammonium adipate or mixtures thereof in any ratio to yield a desired solution pH.

The addition of a wetting agent allows the acidic aqueous composition to completely wet the glass surface to provide uniform coverage with a direct liquid application method such as a linear curtain spray, without the overspray waste of an atomized or fog-type application method.

The present invention will be further understood from the descriptions of specific examples which follow.

EXAMPLE I

In accordance with the present invention, sheets of clear float glass 2.3 millimeters thick were sprayed with buffered adipic acid, i.e. ammonium adipate, prepared by reacting 14.6 grams of adipic acid and 6.8 grams of ammonium hydroxide (29.8 percent aqueous solution) per liter of water containing 0.3 grams of surfactant (MAZAWET 77 from PPG). Six sprayed sheets were stacked together in a pack and exposed to 140° F., 100 percent relative humidity to evaluate the development of surface stain. Six additional sheets sprayed with the same ammonium adipate solution were stacked separated by LUCITE beads and exposed to 140° F., 100 percent relative humidity to evaluate the development of stain on the glass surfaces. For comparison, six sheets of clear float glass 2.3 millimeters thick were sprayed with a solution comprising 7.3 grams of adipic acid and 7.3 grams of malic acid per liter of water, and stacked together in a pack and exposed to 140° F., 100 percent relative humidity, to evaluate the development of surface stain in a pack representative of commercially shipped glass sheets. After 21 days, all of the above samples were essentially stainfree. After 7 weeks, no stain was found on either the non-buffered or buffered acid treated glass surfaces. Stacks of glass sheets with no protection exhibit heavy stain on the surfaces after only 15 days of exposure.

EXAMPLE II

A continuous float glass ribbon was sprayed with solutions of adipic acid or ammonium adipate to determine whether there was any difference in stain prevention. The amount of adipic acid or ammonium adipate deposited on the glass surface was measured by washing glass samples of given dimensions with ultrapure water to remove the deposited material, then analyzing the wash solutions by ion chromatography to quantify the amount of material. The coverage in milligrams per square foot ($mg/ft^2$) of adipic acid equivalent was then calculated. Stain testing was conducted as in the previous example, by subjecting simulated pack samples of glass to 140° F. air saturated with water vapor. The results indicate that ammonium adipate is as effective as adipic acid deposited at the same levels under the same conditions. In addition, ammonium adipate is easily removed from the glass surface with water. Glass samples having ammonium adipate coverage of about 9 milligrams per square foot of glass surface survived 28 days without stain in the 140° F., 100 percent relative humidity test.

The above examples are offered to illustrate the present invention. Various organic acids may be used in buffered form, prepared by any means of utilizing a buffering agent. For example, in a preferred embodiment of the present invention, adipic acid and diammonium adipate are mixed in approximately equimolar amounts, rather than reacting adipic acid with ammonia. The resulting buffered acid may be applied by any suitable technique. The scope of the invention is defined by the following claims.

What is claimed is:

1. An article comprising:

a glass sheet having opposed major surfaces; and a buffered organic aliphatic acid material disposed over at least one of the major surfaces of the glass sheet to prevent staining of the major surface of the glass sheet over which the acid material is disposed.

2. The article according to claim 1, wherein the glass sheet comprises soda-lime-silica glass.

3. The article according to claim 2, wherein the organic acid is selected from the group consisting of monocarboxylic acids, dicarboxylic acids, tricarboxylic acids, tetracarboxylic acids, hydroxy-dicarboxylic acids and mixtures thereof.

4. The article according to claim 3, wherein the organic acid is buffered by reaction with a buffering agent selected from the group consisting of ammonia, ammonium hydroxide, and amines.

5. The article according to claim 4, wherein the buffering agent is selected from the group consisting of ammonia and ammonium hydroxide.

6. The article according to claim 5, wherein the organic acid is buffered with up to an equimolar proportion of ammonium hydroxide.

7. The article according to claim 5, wherein the organic acid comprises a dicarboxylic acid, which is buffered with ammonium hydroxide in a molar ratio of up to 2:1.

8. The article according to claim 5, wherein the organic acid comprises adipic acid.

9. The article according to claim 8, wherein the buffered organic acid is an ammonium adipate compound selected from the group consisting of monoammonium adipate, diammonium adipate and mixtures thereof.

10. The article according to claim 9, wherein the surface is treated with 5 to 40 milligrams per square foot of said ammonium adipate compound.

11. The article according to claim 10, wherein the surface is treated with 5 to 20 milligrams per square foot of said ammonium adipate compound.

12. The article according to claim 11, further comprising a particulate interleaving material.

13. The article according to claim 3 wherein the organic acid is selected from the group consisting of adipic acid, citric acid, malic acid, maleic acid, succinic acid, tartaric acid, ethylenediaminetetraacetic acid and mixtures thereof.

14. The article of claim 1 wherein the article is one of a plurality of articles, the article comprising a plurality of glass sheets, stacked with at least one major surface of a sheet in parallel facing relationship with a major surface of at least one other of said sheets, and disposed between said facing major surfaces the buffered organic aliphatic acid material.

* * * * *